US010536326B2

(12) United States Patent
Mills et al.

(10) Patent No.: US 10,536,326 B2
(45) Date of Patent: Jan. 14, 2020

(54) NETWORK REDUNDANCY AND FAILURE DETECTION

(71) Applicant: Affirmed Networks, Inc., Acton, MA (US)

(72) Inventors: Grant Mills, Acton, MA (US); Narsi Veldanda, Northboro, MA (US); Ronald M. Parker, Boxborough, MA (US); Jonathan West, Acton, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 252 days.

(21) Appl. No.: 15/393,476

(22) Filed: Dec. 29, 2016

(65) Prior Publication Data

US 2017/0195169 A1 Jul. 6, 2017

Related U.S. Application Data

(60) Provisional application No. 62/273,532, filed on Dec. 31, 2015.

(51) Int. Cl.
*H04L 12/24* (2006.01)
*H04L 29/08* (2006.01)
(Continued)

(52) U.S. Cl.
CPC ...... *H04L 41/0677* (2013.01); *H04L 41/0668* (2013.01); *H04L 45/123* (2013.01);
(Continued)

(58) Field of Classification Search
CPC ..... H04L 41/0677; H04L 45/28; H04L 45/22; H04L 45/123; H04L 45/58;
(Continued)

(56) References Cited

U.S. PATENT DOCUMENTS 8,428,610 B2   4/2013   Chowdhury et al.
8,477,730 B2   7/2013   Rajagopalan et al.
(Continued)

FOREIGN PATENT DOCUMENTS

CN   101093590 A   12/2007
CN   102390184 A    3/2012
(Continued)

OTHER PUBLICATIONS

3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
(Continued)

*Primary Examiner* — Walter J Divito
(74) *Attorney, Agent, or Firm* — Wilmer Cutler Pickering Hale and Dorr LLP

(57) ABSTRACT

Method of and systems for network redundancy and failure detection are disclosed. A method of assigning runtime states to nodes in a network includes transmitting initial route metric values associated with IP addresses of mobile network nodes to a router system, the relative magnitudes of the metric values being based on primary or secondary node status and active or standby runtime states. The method also includes transmitting packet(s) from one or more mobile network nodes to the router system destined for a server and one or more mobile network nodes receiving a response to the packet transmission via the router system from the server. In response to receiving the response to the transmissions, the one or more mobile network nodes setting subsequent route metric values having a reversed relative magnitude relationship to that of the initial route metric values.

20 Claims, 8 Drawing Sheets

(51) Int. Cl.
*H04L 29/12* (2006.01)
*H04L 12/703* (2013.01)
*H04L 12/707* (2013.01)
*H04L 12/715* (2013.01)
*H04L 12/721* (2013.01)
*H04L 12/741* (2013.01)
*H04L 12/775* (2013.01)

(52) U.S. Cl.
CPC .............. *H04L 45/22* (2013.01); *H04L 45/28* (2013.01); *H04L 45/58* (2013.01); *H04L 45/74* (2013.01); *H04L 61/2007* (2013.01); *H04L 67/18* (2013.01); *H04L 45/46* (2013.01)

(58) Field of Classification Search
CPC . H04L 41/0668; H04L 61/2007; H04L 67/18; H04L 45/74; H04L 45/46
See application file for complete search history.

(56) References Cited

U.S. PATENT DOCUMENTS

| | | |
|---|---|---|
| 8,522,241 B1 | 8/2013 | Vohra et al. |
| 8,565,070 B2 | 10/2013 | Harper et al. |
| 8,855,051 B2 | 10/2014 | Suh |
| 8,995,262 B2 | 3/2015 | Chowdhury et al. |
| 9,013,993 B2 | 4/2015 | Logan et al. |
| 9,185,595 B2 | 11/2015 | Qu |
| 9,294,981 B2 | 3/2016 | Rajagopalan |
| 9,578,541 B2 | 2/2017 | Seenappa et al. |
| 9,985,875 B1 | 5/2018 | Srinath et al. |
| 2002/0007468 A1 | 1/2002 | Kampe et al. |
| 2002/0062388 A1 | 5/2002 | Ogier et al. |
| 2003/0171114 A1 | 9/2003 | Hastings |
| 2003/0187982 A1 | 10/2003 | Petit |
| 2004/0131023 A1 | 7/2004 | Auterinen |
| 2005/0136832 A1 | 6/2005 | Spreizer |
| 2006/0008063 A1 | 1/2006 | Harnesk et al. |
| 2006/0168655 A1 | 7/2006 | Grandmaitre et al. |
| 2006/0195607 A1* | 8/2006 | Naseh ............... H04L 45/00 709/238 |
| 2006/0294238 A1 | 12/2006 | Naik et al. |
| 2007/0168058 A1 | 7/2007 | Kephart et al. |
| 2008/0014961 A1 | 1/2008 | Lipps et al. |
| 2008/0162984 A1 | 7/2008 | Kalra et al. |
| 2008/0240082 A1 | 10/2008 | Feldman et al. |
| 2009/0109845 A1 | 4/2009 | Andreasen et al. |
| 2009/0124284 A1 | 5/2009 | Scherzer et al. |
| 2009/0300173 A1 | 12/2009 | Bakman et al. |
| 2010/0128708 A1 | 5/2010 | Liu et al. |
| 2010/0238840 A1 | 9/2010 | Lu et al. |
| 2010/0317331 A1 | 12/2010 | Miller |
| 2011/0235505 A1 | 9/2011 | Eswara et al. |
| 2011/0258433 A1 | 10/2011 | Pulini et al. |
| 2012/0023360 A1 | 1/2012 | Chang et al. |
| 2012/0084449 A1 | 4/2012 | Delos Reyes et al. |
| 2012/0106349 A1 | 5/2012 | Adjakple et al. |
| 2012/0190331 A1 | 7/2012 | Ahmed et al. |
| 2012/0236708 A1 | 9/2012 | Kompella et al. |
| 2013/0054789 A1 | 2/2013 | Bajamahal |
| 2013/0121298 A1 | 5/2013 | Rune et al. |
| 2013/0173804 A1 | 7/2013 | Murthy et al. |
| 2013/0188555 A1 | 7/2013 | Olsson et al. |
| 2013/0212205 A1 | 8/2013 | Flockhart et al. |
| 2013/0231080 A1 | 9/2013 | Cheuk et al. |
| 2014/0047282 A1 | 2/2014 | Deb et al. |
| 2014/0098671 A1 | 4/2014 | Raleigh et al. |
| 2014/0148165 A1 | 5/2014 | Serravalle et al. |
| 2015/0237539 A1 | 8/2015 | Guo |
| 2015/0271255 A1 | 9/2015 | Mackay et al. |
| 2016/0029278 A1 | 1/2016 | Poikonen |
| 2016/0285923 A1 | 9/2016 | Kodaypak |
| 2016/0337841 A1 | 11/2016 | Won |
| 2017/0257810 A1 | 9/2017 | Gandhi |

FOREIGN PATENT DOCUMENTS

| | | |
|---|---|---|
| CN | 102555536 A | 7/2012 |
| CN | 202965525 U | 6/2013 |
| CN | 203311505 U | 11/2013 |
| EP | 1011974 A1 | 6/2000 |
| EP | 2200369 A2 | 6/2010 |
| WO | WO-2004004216 A1 | 1/2004 |
| WO | WO-2013143831 A1 | 10/2013 |
| WO | WO-2016206118 | 12/2016 |
| WO | WO-2016206118 A1 | 12/2016 |
| WO | WO-2017004158 A1 | 1/2017 |

OTHER PUBLICATIONS

3GPP TR 21.905 v15.0.0 (Mar. 2018), "3rd Generation Partnership Project; Technical Specification Group Services and System Aspects; Vocabulary for 3GPP Specifications (Release 15)," Valbonne, France, Mar. 2018 (65 pages).

3GPP TS 23.682 v. 15.5.0 (Jun. 2018),"3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).

3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).

International Search Report and Written Opinion issued by the U.S. Patent and Trademark Office as Searching Authority, issued in International Application PCT/US16/69092, dated Mar. 29, 2017 (15 pages).

3GPP TR 23.722 v0.1.1, "3rd Generation Partnership Project; Technical Specification Group Services and System Aspects; Study on Common API Framework for 3GPP Northbound APIs (Release 15)", Valbonne, France, Apr. 2017 (20 pages).

3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).

CISCO Systems, "Deployment Guide: CISCO IOS IPSEC High Availability," 2005, accessed http://www.cisco.com/en/US/technologies/tk583/tk372/technologies_white_paper0900aecd80278edf.pdf, retrieved Jul. 26, 2018 (16 pages).

International Search Report and Written Opinion issued by the European Patent Office as International Searching Authority in International Application No. PCT/US2018/035345, dated Aug. 13, 2018 (19 pages).

International Search Report and Written Opinion issued by the European Patent Office as International Searching Authority in International Application No. PCT/US2018/031423, dated Oct. 9, 2018 (18 pages).

3GPP Ts 23.204 v13.1.0 (Jun. 2016), "3rd Generation Partnership Project; Technical Specification Group Services and Systems Aspects; Support of Short Message Service (SMS) over Generic 3GPP Internet Protocol (IP) Access; Stage 2 (Release 13)", Valbonne, France, Jun. 2016 (59 pages).

3GPP Ts 23.214 V14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).

3GPP Ts 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).

3GPP Ts 23.236 v13.0.0 (Jun. 2015); "3rd Generation Partnership Project; Technical Specification Group Services and System Aspects; Intra-domain connection of Radio Access Network (RAN) nodes to

(56) References Cited

OTHER PUBLICATIONS multiple Core Network (CN) nodes (Release 13)", 3GPP Organizational Partners, Valbonne, France, Jun. 2015 (41 pages).
3GPP Ts 23.401 V13.9.0 (Dec. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).
3GPP Ts 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP Ts 29.128 v13.3.0 (Dec. 2016), "3rd Generation Partnership Project; Technical Specification Group Core Network and Terminals; Mobility Management Entity (MME) and Serving GPRS Support Node (SGSN) Interfaces for Interworking with Packet Data Networks and Applications (Release 13)", Valbonne, France, Dec. 2016 (47 pages).

3GPP Ts 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).
International Search Report and Written Report issued by the U.S. Patent and Trademark Office as International Searching Authority, issued in PCT/US17/017913, dated Mar. 13, 2017 (14 pages).
3GPP Ts 23.401v13.5.0 (Dec. 2015), "3rd Generation Partnership Project: Technical Specification Group Services and System Aspects; General Packet Radio Service (GPRS) Enhancements for Evolved Universal Terrestrial Radio Access Network (E-UTRAN) Access (Release 13)", 3GPP Organizational Partners, Valbonne France, Dec. 2015 (337 pages).
European Extended Search Report issued in EP16882635.2, dated 17 Jul. 2019 (13 pages).
International Search Report and Written Opinion issued by the European Patent Office as International Searching Authority for International Application No. PCT/US19/43037, dated Oct. 29, 2019 (14 pages).

\* cited by examiner an3000-mcm-slot8cpu1# show geographic-redundancy

| GROUP NAME | GROUP ID | ADMIN STATE | MODE | ROLE | RUN TIME STATE | OPER STATUS | SYNC RECORDS | GEO-LINK STATUS |
|---|---|---|---|---|---|---|---|---|
| GEO-GRP-1 | 3 | enabled | hot-auto | primary | active | up | 1 | up |

| GROUP NAME | LINK TYPE | LINK SERVICE | STATUS | PEER STATUS |
|---|---|---|---|---|
| GEO-GRP-1 | shared | AAA | up | down |
| GEO-GRP-1 | shared | PCRF | up | down |
| GEO-GRP-1 | shared | OCS | up | down |
| GEO-GRP-1 | private | AAA | up | up |
| GEO-GRP-1 | private | PCRF | up | up |
| GEO-GRP-1 | private | OCS | up | up |

FIG. 6A an3000-mcm-slot8cpu1# show geographic-redundancy

| GROUP NAME | GROUP ID | ADMIN STATE | MODE | ROLE | RUN TIME STATE | OPER STATUS | SYNC RECORDS | GEO-LINK STATUS |
|---|---|---|---|---|---|---|---|---|
| GEO-GRP-1 | 3 | enabled | hot-auto | secondary | standby | down | 1 | up |

| GROUP NAME | LINK TYPE | LINK SERVICE | STATUS | PEER STATUS |
|---|---|---|---|---|
| GEO-GRP-1 | shared | AAA | down | up |
| GEO-GRP-1 | shared | PCRF | down | up |
| GEO-GRP-1 | shared | OCS | down | up |
| GEO-GRP-1 | private | AAA | up | up |
| GEO-GRP-1 | private | PCRF | up | up |
| GEO-GRP-1 | private | OCS | up | up |

FIG. 6B

| Admin State 702 | Role 704 | Runtime State 706 | Advertised Route Metric 708 | |
|---|---|---|---|---|
| Enable | Primary | Active | 1 and 3 (during split brain) | 710 |
| Enable | Primary | Standby | 3 | 712 |
| Enable | Secondary | Active | 2 | 714 |
| Enable | Secondary | Standby | 4 | 716 |
| Disable | Any | Any | Not advertised | 718 |

FIG. 7

NETWORK REDUNDANCY AND FAILURE DETECTION

CROSS REFERENCE TO RELATED APPLICATIONS

This application claims priority to U.S. Provisional Application No. 62/273,532, filed on Dec. 31, 2015, which is incorporated herein by reference.

TECHNICAL FIELD

The techniques described herein generally relate to managing network resources, and in particular to network redundancy and failure detection.

BACKGROUND

Prior systems for providing geographic redundancy include a dedicated standby network-element at geographically separate location (a geo-site) to synchronize up subscriber state-information periodically, and take the active state in case of some catastrophe (ex: earthquake, military attack) at active site. The problem with this system is the standby geo-site is almost idle and wireless operators are forced to double their capital expenditures/operating expense (CAPEX/OPEX) spending for this rare event.

SUMMARY

Under an aspect of the invention, systems for and methods of achieving network redundancy and failure detection are presented.

Under an aspect of the invention, a computerized method of assigning nodes to active and standby runtime states in a mobile network includes transmitting, from a first mobile network node, an initial first route metric value associated with an IP address of the first mobile network node to a router system. The first mobile network node corresponds to a primary node and an active runtime state. The method also includes transmitting, from a second mobile network node, an initial second route metric value associated with an IP address of the second mobile network node to the router system. The second mobile network node corresponds to a secondary node and a standby runtime state. The second route metric value is higher than the first route metric value and a lower route metric value indicates an active runtime state and a higher value indicates a standby runtime state. The method also includes transmitting a first packet, from the first mobile network node, to the router system for transmission to a server and/or a second packet, from the second mobile network node, to the router system for transmission to the server. The first packet is associated with a first source address corresponding to the IP address of the first mobile network node and a first destination address corresponding to an IP address of the server. The second packet is associated with a second source address corresponding to the IP address of the second mobile network node and a second destination address corresponding to the IP address of the server. The second source address is the same as the first source address. In response to the first mobile network node receiving a response from the router system indicating a response from the server based on transmission of the first packet, the method also includes setting, by the first mobile network node, a subsequent first route metric value for transmission to the router system, and setting, by the second mobile network node, a subsequent second value for transmission to the router system. The subsequent first route metric value is less than the subsequent second route metric value, thereby indicating that the first mobile network node is in an active runtime state and the second mobile network node is in a standby runtime state. In response to the second mobile network node receiving a response from the router system indicating a response from the server based on transmission of the second packet, the method also includes, setting, by the first mobile network node, a subsequent first route metric value for transmission to the router system, and setting, by the second mobile network node, a subsequent second route metric value for transmission to the router system. The subsequent second route metric value is less than the subsequent first route metric value, thereby indicating that the first mobile network node is in a standby runtime state and the second mobile network node is in an active runtime state.

In an embodiment of the invention, the router system comprises a first router device and a second router device. The first mobile network node communicates with the first router device, and the second mobile network node communicates with the second router device. Optionally, the first router device and the second router device synchronize route metric value information.

In an embodiment of the invention, the first mobile network node and the second mobile network node are each associated with at least one of a Serving Gateway (SGW) module, Packet Data Network Gateway (PGW) module, and a Gateway GPRS Support Node (GGSN).

In an embodiment of the invention, the first mobile network node comprises a portion of a first geographic cluster, and the second mobile network node comprises a portion of a second geographic cluster. Each of the first geographic cluster and the second geographic cluster including multiple mobile network nodes. Optionally, the first geographic cluster is disposed in a first geographic location, and the second geographic cluster is disposed in a second geographic location, in which the first geographic location being different than the second geographic location. Further optionally, each of the first geographic cluster and the second geographic cluster include a combination of active mobile network nodes and standby mobile network nodes, such that load is shared by multiple geographic clusters when one geographic cluster fails.

In an embodiment of the invention, the second mobile network node receives the response from the router system indicating the response from the server based on the transmission of the second packet is based on an indication that the first mobile network node is unreachable. Optionally, the indication that the first mobile network node is unreachable includes removal of a source loopback IP address route associated with the first mobile network node from the router system.

In an embodiment of the invention, the second mobile network node receiving the response from the router indicating the response from the server based on the transmission of the second packet is based on receiving an instruction to force the first mobile network node to assume the standby runtime state and second mobile network node to assume the active runtime state.

In an embodiment of the invention, the second mobile network node assumes the active runtime state when the second mobile network node receives a response from the router system indicating the response from the server based on the transmission of the second packet.

Under an aspect of the invention, a computing system for assigning nodes to active and standby runtime states in a mobile network includes a first mobile network node and a second mobile network node. The first mobile network node includes a first mobile network node processor and a first mobile network node memory in communication with the first mobile network node processor. The second mobile network node includes a second mobile network node processor and a second mobile network node memory in communication with the second mobile network node processor. At least one of the first and the second mobile network node memories include instructions that when executed cause at least one of the first and second mobile network processor to transmit, from the first mobile network node, an initial first route metric value associated with an IP address of the first mobile network node to a router system. The first mobile network node corresponds to a primary node and an active runtime state. The instructions also cause at least one of the first and second mobile network processor to transmit, from the second mobile network node, an initial second route metric value associated with an IP address of the second mobile network node to the router system. The second mobile network node corresponds to a secondary node and a standby runtime state. The second route metric value is higher than the first route metric value and a lower route metric value indicates an active runtime state and a higher value indicates a standby runtime state. The instructions also cause at least one of the first and second mobile network processor to transmit a first packet, from the first mobile network node, to the router system for transmission to a server and/or a second packet, from the second mobile network node, to the router system for transmission to the server. The first packet is associated with a first source address corresponding to the IP address of the first mobile network node and a first destination address corresponding to an IP address of the server. The second packet is associated with a second source address corresponding to the IP address of the second mobile network node and a second destination address corresponding to the IP address of the server. The second source address is the same as the first source address. The instructions also cause at least one of the first and second mobile network processor to, in response to the first mobile network node receiving a response from the router system indicating a response from the server based on transmission of the first packet, set, by the first mobile network node, a subsequent first route metric value for transmission to the router system, and set, by the second mobile network node, a subsequent second value for transmission to the router system. The subsequent first route metric value is less than the subsequent second route metric value, thereby indicating that the first mobile network node is in an active runtime state and the second mobile network node is in a standby runtime state. The instructions also cause at least one of the first and second mobile network processor to, in response to the second mobile network node receiving a response from the router system indicating a response from the server based on transmission of the second packet, set, by the first mobile network node, a subsequent first route metric value for transmission to the router system, and set, by the second mobile network node, a subsequent second route metric value for transmission to the router system. The subsequent second route metric value is less than the subsequent first route metric value, thereby indicating that the first mobile network node is in a standby runtime state and the second mobile network node is in an active runtime state.

Any of the above aspects or embodiments may be combined with any other aspects or embodiments set forth above or generally herein and remain within the scope of the invention. These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 6A shows the status of a primary active geo-site during steady state, according to some embodiments.

FIG. 6B shows the status of a secondary geo-site during steady state, according to some embodiments.

FIG. 7 is a table showing IP route costs, according to some embodiments.

DETAILED DESCRIPTION

Geographic-Redundancy Techniques

For geographic redundancy (geo-redundancy), to save operator CAPEX/OPEX expenditures, the present disclosure describes N-Way geo-redundancy techniques such that multiple geo-sites can be active and accepting calls. There are no dedicated standby geo-sites. Each geo-site subscriber session state-information is check-pointed on remaining geo-sites in a distributed way. When one geo-site fails, the remaining geo-sites restore the failed geo-site subscriber session state-information and provide the service. In general, the prefix "geo-" is added to represent "geographic".

Figure 1:
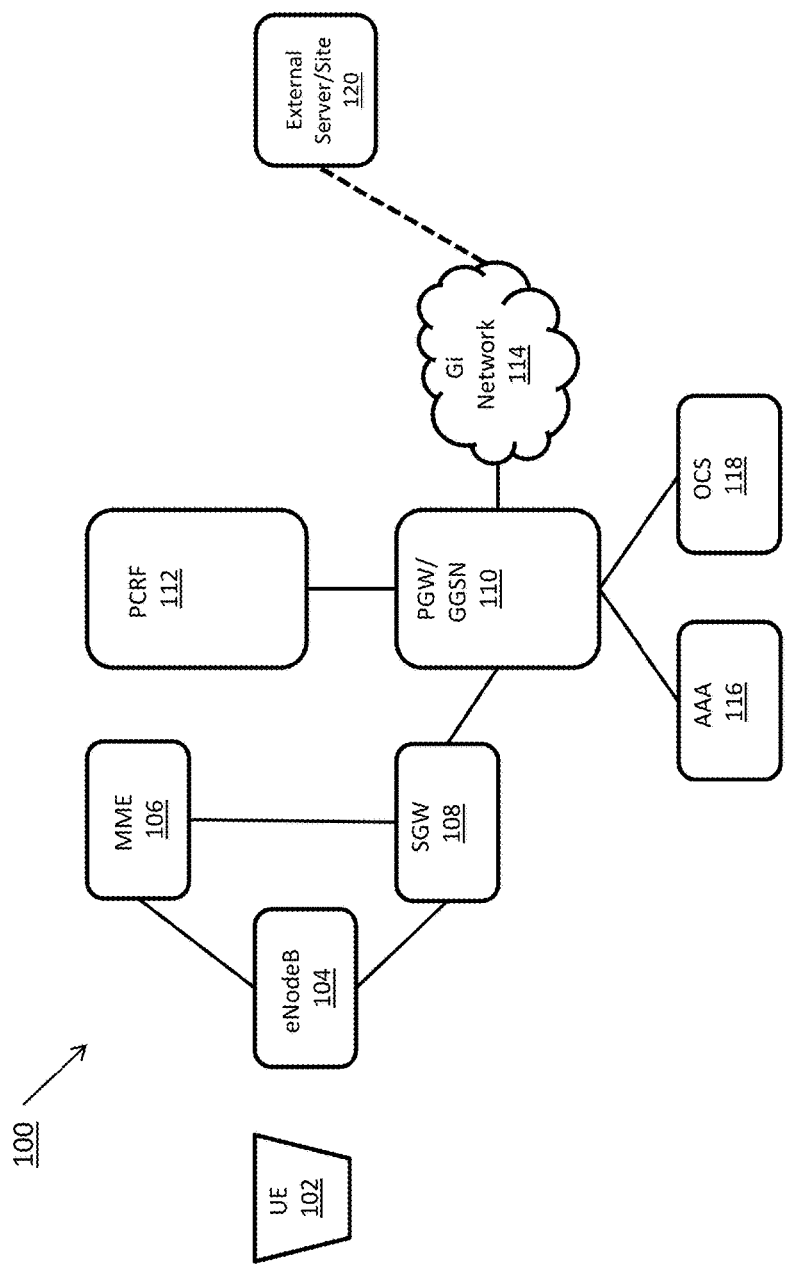
FIG. 1 is a system diagram showing the networked system.

FIG. 1 is a system diagram showing the networked system 100. System 100 includes user equipment 102, a server 104, and a network 106. System 100 includes a user equipment (UE) 102, evolved node B (eNodeB) 104, multimedia messaging service (MME) 106, serving gateway (SGW) module 108, packet data network gateway (PGW)/Gateway GPRS Support Node (GGSN) 110, policy and charging rules function (PCRF) 112, a network 114 (e.g., with a Gi interface), Authentication, Authorization and Accounting (AAA) 116, online charging system (OCS) 118, and external server/site 120.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 106 and SGW 108.

Backhaul is a process of transferring packets or communication signals over relatively long distances to a separate location for processing. SGW 108 routes and forwards user data packets, while also acting as the mobility anchor for a user plane during inter-eNodeB handovers. MME 106 is a control node in the networked system 100. MME 106 handles the LTE related control plane signaling that also includes mobility and security functions for UE 102 that attaches to the LTE Radio network. MME 106 also handles UE being in idle mode, including support for Tracking area management and paging procedures.

PGW/GGSN 110 is the point of interconnect between the mobile network and the external IP networks and handles policy enforcement, IP Address allocation and charging functions. PGW and GGSN serve similar functions and are used interchangeably herein in this disclosure for 3G, 4G and LTE networks. PCRF 112 (Policy and Charging Rules Function) interfaces with the PGW to provide PGW with the appropriate policies to enforce for each subscriber. Gi Network 114 is an Internet Protocol (IP) based network connecting the PGW with a packet data network or the Internet. Gi Network 114 connects to external servers or sites 120. AAA 116 is the Authentication, Authorization and Accounting server, providing authorization, policy enforcement and charging/accounting services for the PGW. OCS 118 is an online charging system that allows service providers to charge their customers based on the customers' real time usage of mobile services.

Terms having their generally understood meanings in the art are used to describe aspects of the invention—examples follow. Gi and SGi interfaces are generally understood to mean interfaces that are used to exchange data with an external packet network. A Gn interface is generally understood to mean an interface that is used to support mobility and applies when the GGSN and SGSN (Serving GPRS Support Node) are in the same PLMN (Public Land Mobile Network). A Gp interface is generally understood to mean an interface that is used to support mobility and applies when the GGSN and SGSN are in different PLMNs. Meanwhile, Gx, Gy, and Gz interfaces support policy control behavior, online charging, and offline charging as understood in the art.

Figure 2:
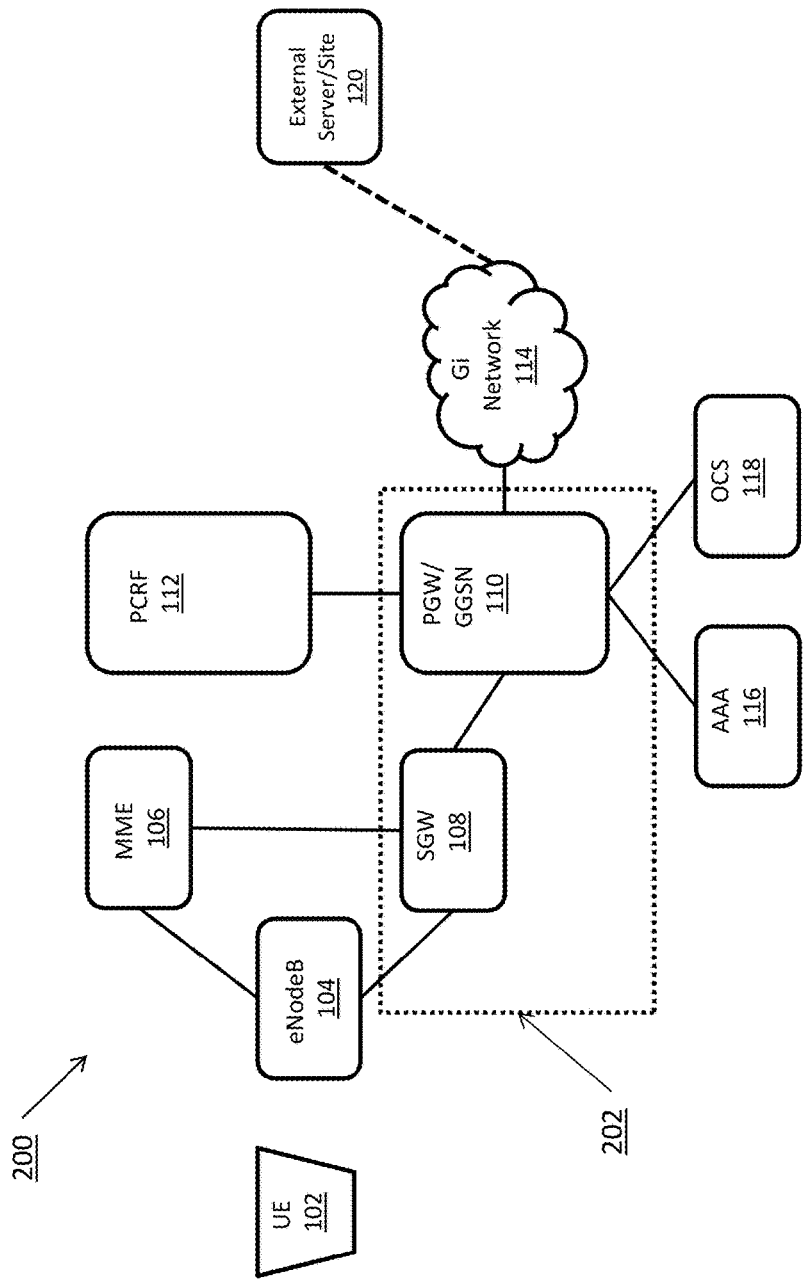
FIG. 2 is a system diagram showing the networked system 200, according to some embodiments.

FIG. 2 is a system diagram showing a networked system. System 200 includes user equipment (UE) 102, evolved node B (eNodeB) 104, multimedia messaging service (MME) 106, serving gateway (SGW) module 108, packet data network gateway (PGW)/Gateway GPRS Support Node (GGSN) 110, policy and charging rules function (PCRF) 112, a network 114, Authentication, Authorization and Accounting (AAA) 116, online charging system (OCS) 118, external server/site 120, and geographic group (geo-group) 202.

Networked system 200 includes similar elements as the networked system 100 previously described. Networked system 200 also shows a geo-group 202. As shown in FIG. 1, geo-group 202 includes serving gateway (SGW) module 108 and packet data network gateway (PGW)/Gateway GPRS Support Node (GGSN) 110. In some embodiments, geo-group 202 is a group of services determined by an operator. The group of services can include SGW, PGW, GGSN, ePDG. Services can also include web proxy, video/image transcoding, and packet inspection (DPI), Charging, QoS, VoLTE. The SGW/PGW can also be considered the session service for voice and data. Geo-group 202 can also include service construct objects associated with the services, for example loopback IPs, UE IP sub-pools, Gx interface, Gy interface, Gz interface, AAA interface, GTP interface.

In some embodiments, geographic group 202 has a role and a run-time state. The role can be primary or secondary and the run-time can be active or standby. In preferred embodiments, a primary geographic group is associated with an active state and a secondary geographic group is associated with a standby state. Geo-graphic groups 202 can be associated with one another to form a cluster, as described in more detail in FIG. 3.

Figure 3:
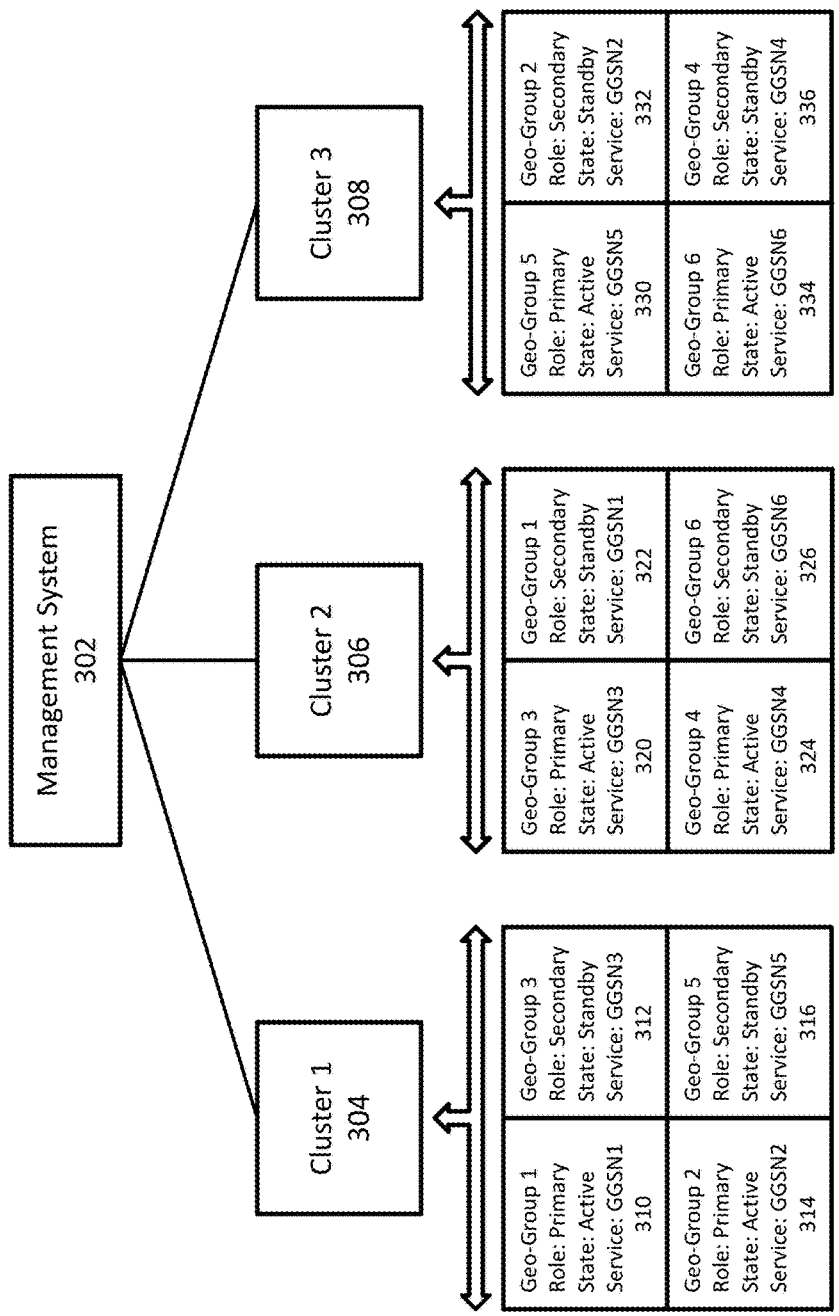
FIG. 3 shows an N-Way geo-redundancy system, according to some embodiments.

FIG. 3 shows an N-Way geo-redundancy system, according to some embodiments. FIG. 3 shows a management system 302, cluster 1 304, cluster 2 306, and cluster 3 308. Cluster 1 304 includes geo-group 1 310, geo-group 2 314, geo-group 3 312 and geo-group 5 316. Cluster 2 306 includes geo-group 3 320, geo-group 1 322, geo-group 4 324 and geo-group 6 326. Cluster 3 308 includes geo-group 5 330, geo-group 2 334, geo-group 6 334 and geo-group 4 336.

In some embodiments, each cluster (also referred to herein as geo-site) is configured with two active geo-groups. Standby counterparts associated with the active geo-groups are located at the remaining two geo-sites. In some embodiments, each geo-site has two primary-active geo-groups and two secondary-standby geo-groups. For example, as shown in FIG. 3, geo-group 1 is located in cluster 1 304 and cluster 2 306, with geo-group 1 in cluster 1 310 associated with a primary-active role and geo-group 1 in cluster 2 322 taking a secondary-standby role. Similarly, geo-group 2 is located in cluster 1 304 and cluster 3 308, with geo-group 2 in cluster 1 312 associated with a primary-active role and geo-group 2 in cluster 3 332 taking a secondary-standby role. Geo-group 3 is located in cluster 1 304 and cluster 2 306, with geo-group 3 in cluster 2 320 associated with a primary-active role and geo-group 3 in cluster 1 312 taking a secondary-standby role. Geo-group 4 is located in cluster 2 306 and cluster 3 308, with geo-group 4 in cluster 2 324 associated with a primary-active role and geo-group 4 in cluster 3 336 taking a secondary-standby role. Geo-group 5 is located in cluster 1 304 and cluster 3 308, with geo-group 5 in cluster 3 330 associated with a primary-active role and geo-group 5 in cluster 1 316 taking a secondary-standby role. Geo-group 6 is located in cluster 2 306 and cluster 3 308, with geo-group 6 in cluster 3 334 associated with a primary-active role and geo-group 6 in cluster 2 326 taking a secondary-standby role.

In some embodiments, active geo-groups provide the services, for example, SGW/PGW/GGSN/ePDG, that are associated with the geo-group. As shown in FIG. 3, for example, each geo-group provides a GGSN (e.g., geo-group 1 provides GGSN1, geo-group 2 provides GGSN2, etc.). The subscriber session state information is synchronized to a standby geo-group site associated with the active geo-group. For example, a GGSN1 session is synchronized between geo-group 1 on cluster 1 310 and geo-group 1 on cluster 322.

When one geo-site fails, for example cluster 1 304 fails, then the standby geo-group geo-sites (geo-group 1 on cluster 2 322 & geo-group 2 on cluster 3 332) detect the failure and transition the geo-group 1 on cluster 2 322 from standby to active state and similarly transitions the geo-group 2 on cluster 3 332 from standby to active state. In some embodiments, there are two modes for detecting failure. One mode, referred to herein as a hot mode, allows the standby group to detect the loss of the active group and automatically switch over from a standby state to an active state. A second mode includes a manual method of transitioning a geo-group from a standby state to an active state. Once a geo-group is transitioned to active, the IP routes are advertised by a new geo-site such that both control and data belonging to geo-group services is forwarded to the new geo-site. When the failed geo-site recovers then the Operator can manually switch these geo-groups back to original geo-site during maintenance window.

Assuming one geo-site failure at a time, the memory usage is doubled by use of the N-way geo-redundancy system described above (similar to 1:1 geo-redundancy), but CPU resources are increased only by (1/(N−1)) for taking the additional load during failover, where N is number of geo-sites (clusters) participating in geo-redundancy.

Management system 302 facilitates communication between the geo-groups and clusters. For example, the management system is used to configure the geo-groups and establish the connections between the clusters. In some embodiments, after that the initial configuration, the clusters communicate amongst themselves based on this configuration. In some embodiments, the management system 302 sets initial values of route metrics and/or coordinates modification of the various routing metrics assigned to geo-sites, geo-groups, and/or elements of the groups.

Detection of Site Loss Techniques

Techniques described herein relate to the detection of site loss. In particular, the techniques described herein relate to using a standby network element at a remote site or sites to accurately detect when an active site fails. A loss of connectivity between sites can cause a false positive detection of loss. If this detection is not accurate then both sites can go to active state and get into a "split-brain" situation where both geographic sites advertise IP routes, like UE IP pools, other loopback IPs, and hence partial traffic lands on each of these geographic sites leading to a network outage for very long period.

Figure 4:
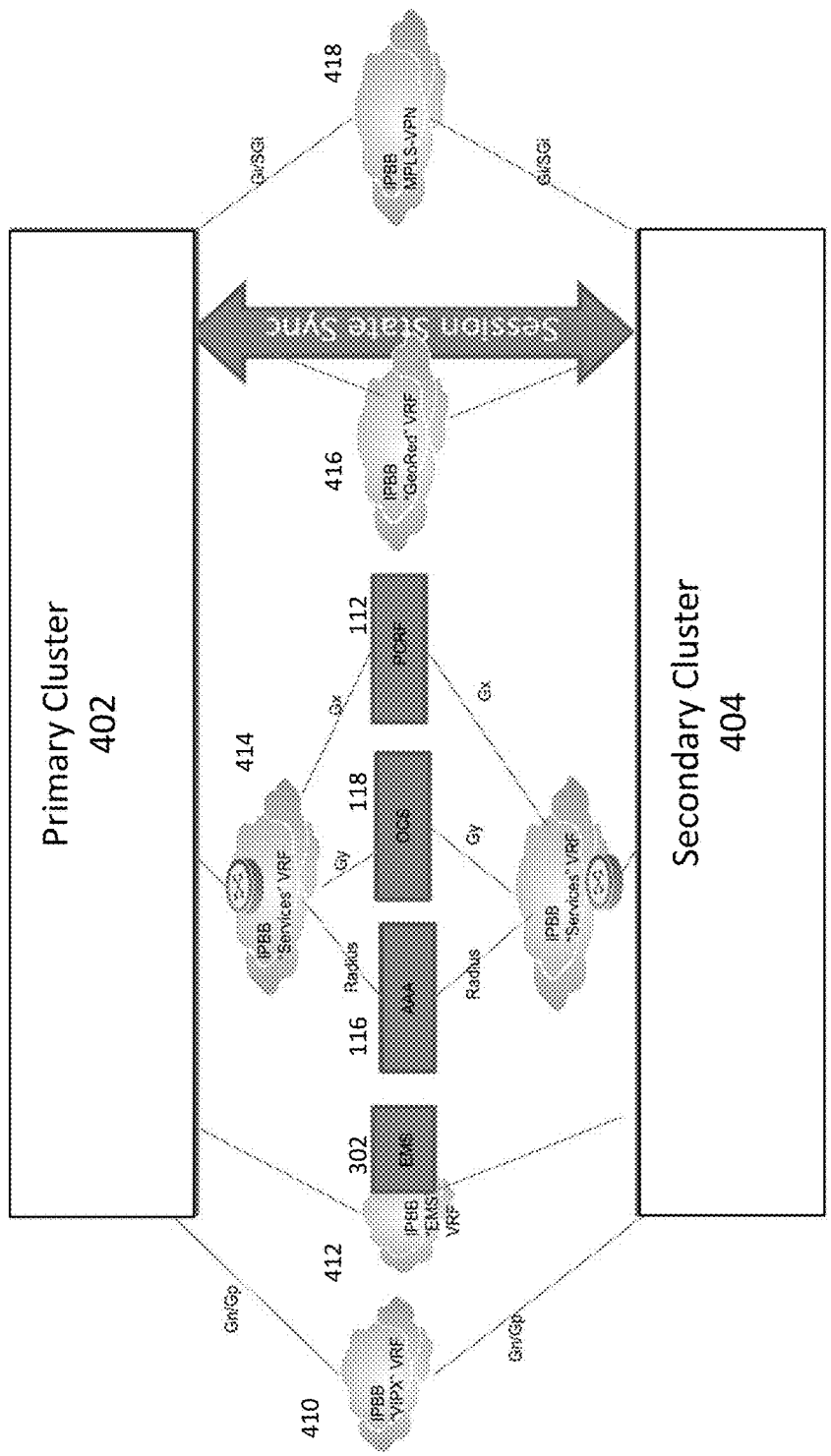
FIG. 4 is a system diagram illustrating two geo-redundancy sites connecting to various nodes in the mobile network for providing gateway services, according to some embodiments.

FIG. 4 is a system diagram illustrating two geo-redundancy sites connecting to various nodes in the mobile network for providing gateway services, according to some embodiments. FIG. 4 shows management system 302, AAA 116, OCS 118, PCRF 112, a primary cluster 402, secondary cluster 404, Internet Protocol Back Bone (IPBB) VIPX Virtual Routing and Forwarding (VRF) construct 410, IPBB "EMS" VRF 412, IPBB "Services" VRF 414, IPBB geo-redundancy VRF 416, and IPBB multiprotocol label switching (MPLS) virtual private networks (VPNs) 418.

clusters 402, 404 provide various SGW/PGW/GGSN/ePDG services. To provide these services, clusters also depend on other network-elements in an operator network, and these elements can be on same/different virtual networks (VRFs) as the SGW/PGW/GGSN/ePDG services. For example, for providing a GGSN service, clusters 402, 404 can talk to SGSNs over a Gn interface, which is on "VIPX" VRF 410 and interface with Gi/SGi interface towards Packet-Data-Network which is on MPLS-VPN VRF 418. Clusters 402, 404 can also talk to PCRF 112 for subscriber policy, AAA 116 for authorization and accounting, OCS 118 for online charging; all of these elements are shown under "Services" VRF 414. Both geo-site clusters 402, 404 can talk to each other over geo-link and this can be on a separate "GeoRed" (geographically redundant) VRF 416.

In some embodiments, accurate active geo-site failure detection includes the geographic sites 402, 404 performing health checks between them. The health check is described in more detail in FIG. 5. The failure detection also includes both geographic sites 402, 404 advertising IP routes, for example loopback IPs used on Gn/Gp side, loopback IPs used for AAA/PCRF/OCS interfaces and UE Pools on Gi/SGi side (UE pools) but at different metrics depending on geo-site roles (e.g., Primary or Secondary) and runtime states (e.g., active or standby). A loopback IP is an address owned by a particular site. In some embodiments, both the active and the standby site have the same loopback IP address (e.g., the source address). In some embodiments, both the active and standby sites send a loopback IP to the same server (e.g., associated with a destination address). For every loopback IP associated with both the active and standby nodes, prior to sending any packets, a route metric to the server is advertised. The route metric can be a configurable value that indicates a preferred route. For example, in some embodiments, standby geo-group publishes a metric that is more expensive to reach the loopback IP addresses. The active geo-group publishes a metric that is cheaper to reach the loopback IP Addresses. Both active and standby geo-groups 'ping' AAA/PCRF/OCS servers with the same loopback IP address. However, the routed network will not reach the standby geo-group loopback IP addresses from the AAA/PCRF/OCS servers as long as the active is still available and has the cheaper route to the loopback IP addresses in place. If the active fails, then the standby route is chosen by the routes in the core and this is how the standby is able to detect the failure of the active. The former standby group goes active and promotes its route via the loopback IP addresses with the cheaper metric now.

Health-Check Between Two Geo-Sites

A health check can also be used between any two sites to determine the status of each site. In some embodiments, a health check can be used with the geo-redundancy techniques described above. Once geo-redundancy is configured and enabled, both active and standby geo-sites can start the geo-link health check procedure. Each geo-site sends a health check packet (e.g., a "hello packet") every second. If a geo-site doesn't receive a health check packet from a peer within a designated time-period (e.g., a "link-timeout" period), then the geo-site declares the link to the peer as "down". Once a geo-site resumes receiving health check packets from the peer, then it will declare geo-site link as "up".

Figure 5:
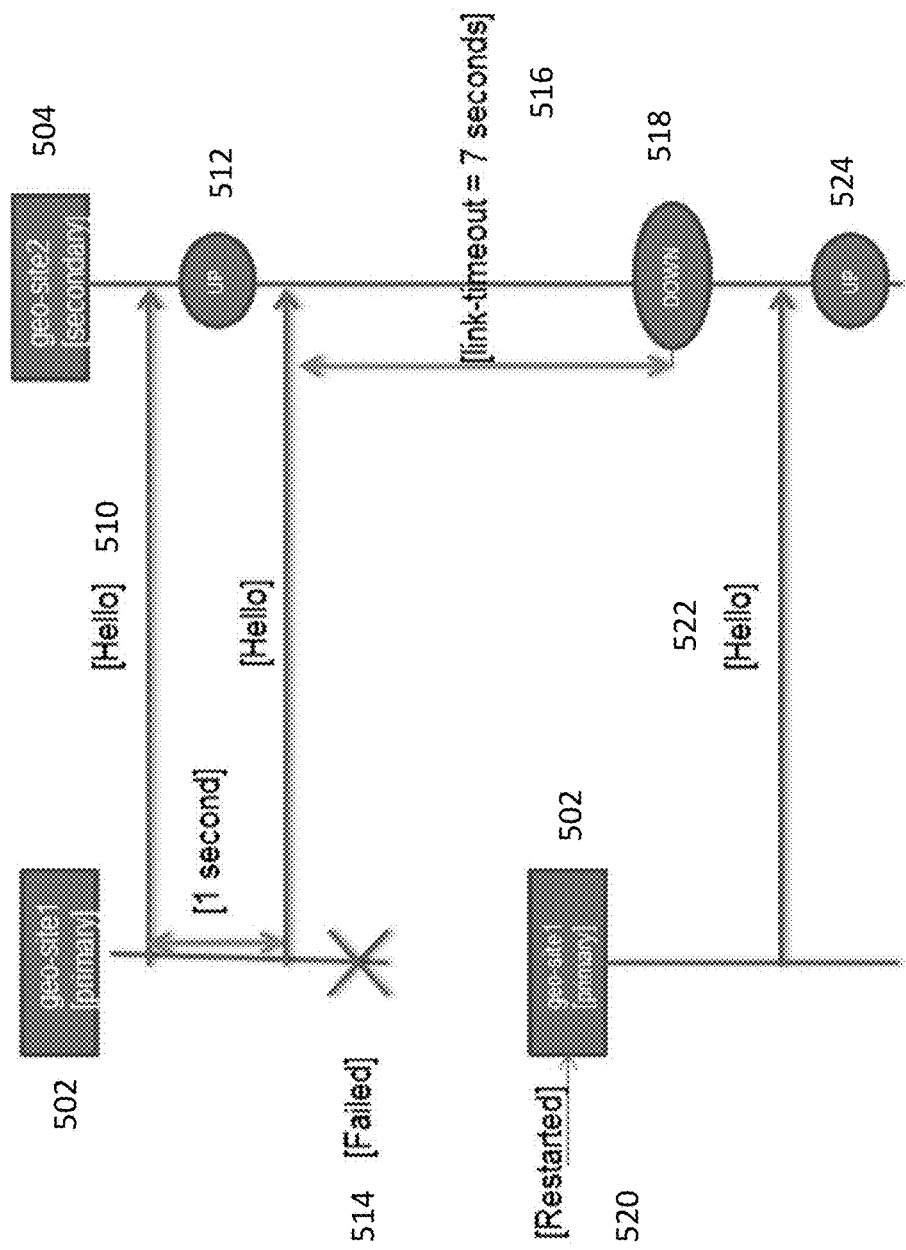
FIG. 5 is a flowchart illustrating a geo-site health check, according to some embodiments.

FIG. 5 is a flowchart illustrating a geo-site health check, according to some embodiments. FIG. 5 shows geo-site 1 502, geo-site 2 504, a first set of hello packets (i.e., health check packets) 510, successful packet reception 512, site failure 514, link timeout 516, restart of packet transmission 520, a second set of hello packets, and a successful packet transmission 524.

Geo-site 1 502 is a primary geo-site and active, and geo-site 2 504 is a secondary geo-site and standby. Geo-site 1 502 sends a hello packet 510 at a specified time interval (e.g., every second). When geo-site 2 receives the hello packet, it associates geo-site 1 with a successful packet reception 512, or an "up" status. When geo-site 1 fails 514, and geo-site 2 does not receive a hello packet from geo-site 1 for "link-timeout" seconds (e.g., 7 seconds) 516, then geo-site 2 declares geo-site link as "down" 518. The "link-timeout" attribute is configurable as different operator networks may need different settings. When geo-site 1 restarts 520 and resumes sending hello packets 522, geo-site 2 504 resumes receiving hello packets from geo-site 1 502, geo-site 2 504 declares geo-site link as "up" 524.

Network Health Checks on AAA/PCRF/OCS Interfaces

Some embodiments of the present invention allow an operator to selectively enable network health checks on AAA, OCS, and PCRF interfaces. In some embodiments, an Operator is required to enable at least one interface. Within each interface, the operator can choose one or more Server-Groups that should be included in a geo-network health check. For declaring a server-group un-healthy, all the servers in the server-group should go un-healthy. For an enabled interface, a health check is performed using both private loopback IP addresses and shared loopback IP addresses. Both geo-sites advertise shared loopback IP addresses at different route metrics, depending on the geo-site role and runtime state. Meanwhile, a geo-site advertises its own private loopback IP addresses. In some embodiments, route metrics determine which node is preferable to reach from a routing point of view. A standby geo-group advertises shared IP address with a less preferred route metric than an active geo-group shared IP address route metric. The relative values of the metric contribute to why packets sent to a shared IP Address will always reach the active geo-group cluster and not the standby geo-group cluster. Relatively more preferred routes can also be described as having a lower route metric value, as having a lower cost, and/or as being "cheaper". Meanwhile, less preferred routes can also be described as having a higher route metric value, as having a higher cost, and/or as being "more expensive." The terms "cheap" and "expensive" does not require that routes be associated with financial cost. However, such a relationship is not excluded from the scope of the invention.

If the active geo-group cluster stops advertising its shared IP address, then the route for this shared IP address towards the active geo-group cluster is removed from the router(s). For the subsequent packets destined to this shared loopback address, the router chooses the next preferred route, which is the standby geo-group cluster's route. The standby geo-group then succeeds the health check using the shared loopback IP, and the standby geo-group takes the active role.

FIG. 6A shows the status of a primary active geo-site during steady state, according to some embodiments. FIG. 6B shows the status of a secondary geo-site during steady state, according to some embodiments. For each geo group at the geo site, the tables show the health and availability of each service link. FIG. 6A shows the Authentication (AAA), PCRF policy engine and charging services (OCS) are up a functional. As such, this geo-site/geo-group is operationally capable of providing service. In FIG. 6B, the table shows that links to the AAA, PCRF and OCS are down. As such, is the group in FIG. 6B is not capable of providing service for this geo-group.

Intelligent Route Advertisements

Both active and standby geo-group geo-sites can advertise shared IP addresses and advertise different route metrics. In some embodiments, the advertised costs for shared IP addresses are chosen such that it is more favorable for an active geo-group cluster to receive the traffic. In some embodiments, multiple discrete route metric cost levels (e.g., 4 levels) are used, which are advertised by the networking layer based on the geo-site role and runtime state. Relatively lower advertised route metrics are treated as more favorable routing paths. Thus, a geo-site with an active runtime state advertises at a relatively lower route cost than a geo-site with a standby runtime state.

FIG. 7 is a table showing IP route costs for a geo-site, according to some embodiments of the invention. FIG. 7 shows columns for admin state 702, role 704, runtime state 706, advertised route metric 708, and rows having associated values for route one 710, route two 712, route three 714, route four 716, and route five 718.

Route One 710: When admin state 702 is enabled, the role 704 is primary, and the runtime state 706 is active, then the advertised route metric 708 is "1", except in a "split brain" situation where advertised route metric 708 is "3". During a split brain situation, where an active primary cluster loses connectivity to the secondary, and the primary also detects a health check failure with one or more shared links, the primary will increase the route metric 708 from "1" to "3" and will remain in the active state. In this scenario, the secondary may independently change state to active if it establishes connectivity with the shared links; it will change the secondary routing metric 708 to "2". This situation allows the primary site to remain active and continue service (but limited due to the loss of shared link). It also allows the secondary to independently transition to active (in the absence of connectivity between the primary and secondary clusters). Once connectivity is restored between the primary and secondary, the clusters negotiate and elect a single active cluster to exit the split-brain condition.

Route Two 712: When admin state 702 is enabled, the role 704 is primary, the runtime state 706 is standby, then the advertised route metric 708 is set to "3".

Route Three 714: When admin state 702 is enabled, the role 704 is secondary, the runtime state 706 is active, then the advertised route metric 708 is set to "2". Route Two 712 is a less preferable route metric than secondary-active which is advertised in Route Two 712.

Route Four 716: When admin state 702 is enabled, the role 704 is secondary, the runtime state 706 is standby, then the advertised route metric 708 is set to 4.

Route Five 718: When admin state 702 is disable, the cluster does not advertise that geo-group. That geo-group can take on any geo-site role 704 and runtime state 706.

A secondary standby geo-site can take over the active role when an active geo-site reboots or is failed. When the geo-link is down and when all shared network-health-checks on the standby geo-site are up, then standby takes the active runtime state. A secondary standby geo-site can also take over the active role when a full or partial network failure towards any one or more of an OCS, PCRF, and/or AAA node occurs. This can happen when (1) the geo-link is up and one or more health-monitoring enabled interfaces shared network-health-checks is down on the active site and (2) the same interfaces shared network-health-check is up on the standby site and the private network-health-check is up for the remaining health-monitoring enabled interfaces on standby site. In such a case, the standby takes the active runtime state. A network operator can also issue a command to switchover to a secondary standby.

Figure 8:
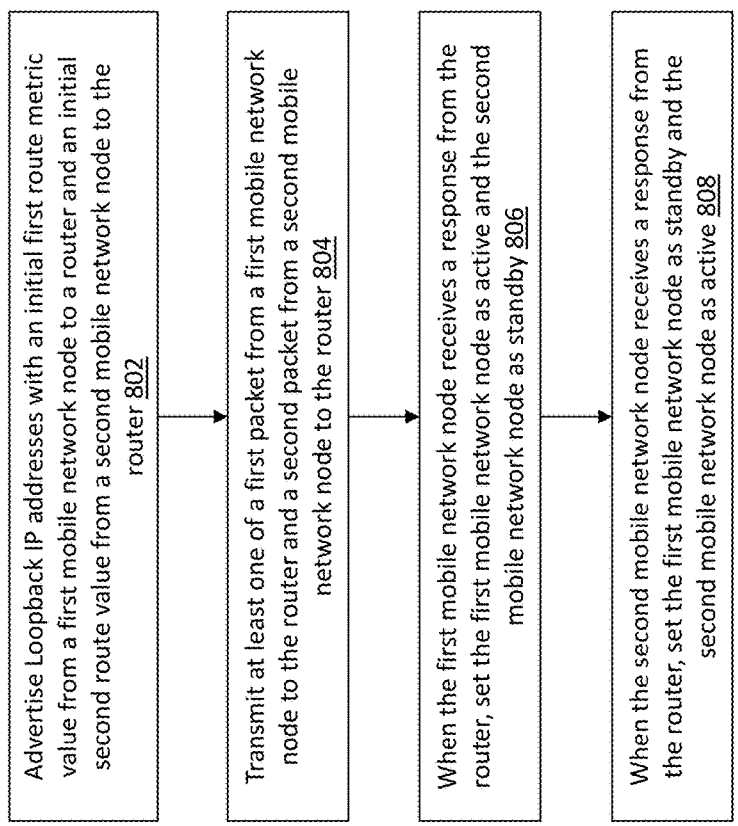
FIG. 8 shows a process for assigning nodes to active and standby states, according to some embodiments.

FIG. 8 is a flowchart showing a process for assigning nodes to active and standby states in a mobile network.

Referring to step 802, an initial first route value is transmitted (via advertising loopback IP addresses) from a first mobile network node to a router and an initial second route value is transmitted from a second mobile network node to the router. In some embodiments, the first mobile network node corresponds to a primary node and an active runtime state. In some embodiments, the second mobile network node corresponds to a secondary node and a standby runtime state. As described above, some of the geo-redundant techniques described herein distribute active and standby services (or nodes) to run on different geographic clusters. Also as described above, in some embodiments, a lower route value indicates an active state and a higher value indicates a standby state. For example, a route that is advertised with a metric of "1" will be chosen by a router over a route that is advertised with a metric of "3". In some embodiments, a second route value corresponding to the secondary node is higher than the first route value, which corresponds to the primary node.

Referring to step 804, at least one of a first packet from a first mobile network node is transmitted to the router and a second packet from a second mobile network node is transmitted to the router. Each of the packets contain a source and destination IP address. In the case of primary and secondary nodes associated with the same service, the source and IP address for each of the first and second packets will be the same. The first and second packets are routed to the server (associated with the destination address) by one or more routers.

Referring to step 806, when the first mobile network node receives a response from the router, the first mobile network node is set as active and the second mobile network node is set as standby. When the router receives a response from the server based on the first and second packets, the router is configured to send the response back to the network node advertising at the lower metric. As described above, when both nodes are active, the first mobile network node will remain in active mode and advertise at the lower metric and the second mobile network node will remain in standby mode and advertise at the comparatively higher metric. In some embodiments, the metrics advertised by both the primary and secondary node are the same as the initial values assigned to the first and second nodes.

Referring to step 808, when the second mobile network node receives a response from the router, the second mobile network node is set as active and the first mobile network node is set as standby. As described above, the second mobile network node can receive a response from the router if, for example, the first mobile network node fails or if an operator reassigns the first mobile network node. In some embodiments, when the second mobile network node receives the response, the second mobile network node becomes the active node and adjusts its metric accordingly to become and remain the active node. For example, when the first mobile network node recovers from a failure or outage, it will enter a standby runtime state. As such, the fist mobile network node will advertise routes at a higher metric than the second mobile network node, which is in the active runtime state. This configuration allows the second mobile network node to continue to receive responses from the server and stay in the active runtime state.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

In one embodiment of the invention, a computerized method for performing network redundancy in a mobile network includes creating, by a management computing system, at each of a plurality of geographic sites in the mobile network, a cluster of network element services. Each of the network element services is associated with a network element type and is designated as one of a primary or secondary state. Each cluster includes at least one network element service associated with a primary state and one network element service associated with a secondary state. The method also includes detecting, by the management computing system, a failure associated with a primary state network element service of a first type at a first geographic site and identifying, by the management computing system, a second network element service of a first type at a second geographic site associated with a secondary state. The method further includes switching, by the management computing system, the designation of the second network element service from a secondary state to a primary state thereby routing service to the second network element service when the first network element fails.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computerized method of assigning nodes to active and standby runtime states in a mobile network, the computerized method comprising:

transmitting, from a first mobile network node, an initial first route metric value associated with an IP address of the first mobile network node to a router system, the first mobile network node corresponding to a primary node and an active runtime state;

transmitting, from a second mobile network node, an initial second route metric value associated with an IP address of the second mobile network node to the router system, the second mobile network node corresponding to a secondary node and a standby runtime state, wherein the second route metric value is higher than the first route metric value, further wherein a lower route metric value indicates an active runtime state and a higher value indicates a standby runtime state;

transmitting at least one of:

a first packet, from the first mobile network node, to the router system for transmission to a server, the first packet being associated with a first source address corresponding to the IP address of the first mobile network node and a first destination address corresponding to an IP address of the server, and a second packet, from the second mobile network node, to the router system for transmission to the server, the second packet being associated with a second source address corresponding to the IP address of the second mobile network node and a second destination address corresponding to the IP address of the server, the second source address being the same as the first source address;

in response to the first mobile network node receiving a response from the router system indicating a response from the server based on transmission of the first packet:

setting, by the first mobile network node, a subsequent first route metric value for transmission to the router system, and setting, by the second mobile network node, a subsequent second value for transmission to the router system, wherein the subsequent first route metric value is less than the subsequent second route metric value, thereby indicating that the first mobile network node is in an active runtime state and the second mobile network node is in a standby runtime state; and in response to the second mobile network node receiving a response from the router system indicating a response from the server based on transmission of the second packet:

setting, by the first mobile network node, a subsequent first route metric value for transmission to the router system, and setting, by the second mobile network node, a subsequent second route metric value for transmission to the router system, wherein the subsequent second route metric value is less than the subsequent first route metric value, thereby indicating that the first mobile network node is in a standby runtime state and the second mobile network node is in an active runtime state.

2. The method of claim 1, wherein the router system comprises a first router device and a second router device, the first mobile network node communicating with the first router device and the second mobile network node communicating with the second router device.

3. The method of claim 2, wherein the first router device and the second router device synchronize route metric value information.

4. The method of claim 1, wherein the first mobile network node and the second mobile network node are each associated with at least one of a Serving Gateway (SGW) module, Packet Data Network Gateway (PGW) module, and a Gateway GPRS Support Node (GGSN).

5. The method of claim 1, wherein the first mobile network node comprises a portion of a first geographic cluster and the second mobile network node comprises a portion of a second geographic cluster, each of the first geographic cluster and the second geographic cluster including multiple mobile network nodes.

6. The method of claim 5, wherein the first geographic cluster is disposed in a first geographic location, and the second geographic cluster is disposed in a second geographic location, the first geographic location being different than the second geographic location.

7. The method of claim 5, wherein each of the first geographic cluster and the second geographic cluster include a combination of active mobile network nodes and standby mobile network nodes such that load is shared by multiple geographic clusters when one geographic cluster fails.

8. The method of claim 1, wherein the second mobile network node receiving the response from the router system indicating the response from the server based on the transmission of the second packet is based on an indication that the first mobile network node is unreachable.

9. The method of claim 8, wherein the indication that the first mobile network node is unreachable includes removal of a source loopback IP address route associated with the first mobile network node from the router system.

10. The method of claim 1, wherein the second mobile network node receiving the response from the router indicating the response from the server based on the transmission of the second packet is based on receiving an instruction to force the first mobile network node to assume the standby runtime state and second mobile network node to assume the active runtime state.

11. The method of claim 1, further comprising the second mobile network node assuming the active runtime state when the second mobile network node receives a response from the router system indicating the response from the server based on the transmission of the second packet.

12. A computing system for assigning nodes to active and standby runtime states in a mobile network, the system comprising:
a first mobile network node, the first mobile network node comprising:
a first mobile network node processor, and
a first mobile network node memory in communication with the first mobile network node processor; and
a second mobile network node, the second mobile network node comprising:
a second mobile network node processor, and
a second mobile network node memory in communication with the second mobile network node processor;
at least one of the first and the second mobile network node memories comprising instructions that when executed cause at least one of the first and second mobile network processor to:
transmit, from the first mobile network node, an initial first route metric value associated with an IP address of the first mobile network node to a router system, the first mobile network node corresponding to a primary node and an active runtime state,
transmit, from the second mobile network node, an initial second route metric value associated with an IP address of the second mobile network node to the router system, the second mobile network node corresponding to a secondary node and a standby runtime state, wherein the second route metric value is higher than the first route metric value, further wherein a lower route metric value indicates an active runtime state and a higher value indicates a standby runtime state,
transmit at least one of:
a first packet, from the first mobile network node, to the router system for transmission to a server, the first packet being associated with a first source address corresponding to the IP address of the first mobile network node and a first destination address corresponding to an IP address of the server, and
a second packet, from the second mobile network node, to the router system for transmission to the server, the second packet being associated with a second source address corresponding to the IP address of the second mobile network node and a second destination address corresponding to the IP address of the server, the second source address being the same as the first source address,
in response to the first mobile network node receiving a response from the router system indicating a response from the server based on transmission of the first packet:
setting, by the first mobile network node, a subsequent first route metric value for transmission to the router system, and
setting, by the second mobile network node, a subsequent second value for transmission to the router system, wherein the subsequent first route metric value is less than the subsequent second route metric value, thereby indicating that the first mobile network node is in an active runtime state and the second mobile network node is in a standby runtime state, and
in response to the second mobile network node receiving a response from the router system indicating a response from the server based on transmission of the second packet:
setting, by the first mobile network node, a subsequent first route metric value for transmission to the router system, and
setting, by the second mobile network node, a subsequent second route metric value for transmission to the router system, wherein the subsequent second route metric value is less than the subsequent first route metric value, thereby indicating that the first mobile network node is in a standby runtime state and the second mobile network node is in an active runtime state.

13. The system of claim 12, wherein the router system comprises a first router device and a second router device, and the at least one of the first and the second mobile network node memories further comprising instructions that when executed cause the first mobile network processor to communicate with the first router device and cause the second mobile network processor to communicate with the second router device.

14. The system of claim 13, wherein the first router device and the second router device synchronize route metric value information.

15. The system of claim 12, wherein the first mobile network node and the second mobile network node are each associated with at least one of a Serving Gateway (SGW) module, Packet Data Network Gateway (PGW) module, and a Gateway GPRS Support Node (GGSN).

16. The system of claim 12, wherein the first mobile network node comprises a portion of a first geographic cluster and the second mobile network node comprises a portion of a second geographic cluster, each of the first geographic cluster and the second geographic cluster including multiple mobile network nodes.

17. The system of claim 16, wherein the first geographic cluster is disposed in a first geographic location, and the second geographic cluster is disposed in a second geographic location, the first geographic location being different than the second geographic location.

18. The system of claim 16, wherein each of the first geographic cluster and the second geographic cluster include a combination of active mobile network nodes and standby mobile network nodes such that load is shared by multiple geographic clusters when one geographic cluster fails.

19. The system of claim 12, wherein the second mobile network node receiving the response from the router system indicating the response from the server based on the transmission of the second packet is based on an indication that the first mobile network node is unreachable.

20. The system of claim 19, wherein the indication that the first mobile network node is unreachable includes removal of a source loopback IP address route associated with the first mobile network node from the router system.

* * * * *